United States Patent [19]

Gilbert

[11] 4,274,244

[45] Jun. 23, 1981

[54] METHOD AND APPARATUS FOR SEALING POLYESTER FILM IN MINE BOLT CAPSULE

[75] Inventor: Peter T. Gilbert, Schenectady, N.Y.

[73] Assignee: General Electric Company, Schenectady, N.Y.

[21] Appl. No.: 40,217

[22] Filed: May 18, 1979

[51] Int. Cl.³ .............................................. B65B 9/12
[52] U.S. Cl. ........................................ 53/451; 53/551
[58] Field of Search ................ 53/451, 450, 551, 552; 93/19, 35 PC; 156/580.2, 580.1

[56] References Cited

U.S. PATENT DOCUMENTS

| | | | |
|---|---|---|---|
| 3,651,615 | 3/1972 | Bohner et al. | 93/35 PC X |
| 3,661,322 | 5/1972 | Norman | 53/451 X |
| 3,992,854 | 11/1976 | Howell et al. | 53/451 X |
| 4,103,473 | 8/1978 | Bast | 53/551 |

Primary Examiner—Horace M. Culver
Attorney, Agent, or Firm—Morgan, Finnegan, Pine, Foley & Lee

[57] ABSTRACT

An apparatus and method for feeding sheet film material longitudinally from a roll and for forming and sealing the sheet into tubes comprising roller means for supporting a supply roll of film and for feeding the film, folding means at the edge of the film for folding an edge portion, forming means for forming the film into inner and outer tubes, bullet shaped shaping means for shaping the tubes and overlapping the sheet edges, and anvil and ultrasonic stylus means for engaging and fusing the overlapped sheet edges. The method includes feeding and shaping the sheet into tubes, overlapping the sheet edges, feeding the overlapped sheet edges between an anvil and an ultrasonically energized stylus and energizing the stylus to fuse and seal the sheet edges.

7 Claims, 6 Drawing Figures

METHOD AND APPARATUS FOR SEALING POLYESTER FILM IN MINE BOLT CAPSULE

This invention relates to a method and apparatus for forming, sealing and filling compartmentalized containers for reactive materials and, more particularly, to an improved method and apparatus for carrying out the improved method for forming, sealing and filling compartmentalized containers for resin materials and reactive substances for hardening or setting such resin materials for use in anchoring mine bolts.

It is common practice in mining to drill holes, for example in the roof of the mine, to place resin and a hardener in the hole and to then insert a bolt in the resin and hardener in the hole. The resin reacts with the hardener around the bolt in the hole and cements or fixes the bolt in such hole. The resin and hardener not only fill the space between the bolt and hole wall but also tends to flow into cracks, crevices and faults in the wall and, when hardened, affix and anchor the bolt to the structure around the hole and reinforce such structure. The resins and hardeners are selected so that, upon mixing, the reaction is immediate and the resin sets and hardens rapidly. Thus, for example, once the bolt is inserted and turned, setting and hardening of the resin will occur with a turn or a turn and a half of the bolt. Conveniently, the resin and hardener are packaged in compartmentalized containers, the resin and hardener being kept separated until mixing, hardening and setting of the resin is desired.

Any of a number of resin systems can be used in such compartmentalized containers including, among others, epoxies, polyurethanes and polyesters. Typical of the useful resins are the so-called unsaturated polyester resins prepared by esterification of a mixture of ingredients including a polyhydric alcohol and an unsaturated polycarboxylic acid, such materials being combined as desired with cross-linking monomers typified by vinyl monomers, such as, styrene and vinyl toluene, along with various fillers, flow modifiers, thixotropic agents, flame retardant materials, plasticizers and initiators or curing agents which are typically of the well known peroxide type. Such materials are described in the patent literature, such as, in U.S. Pat. Nos. 3,302,410; 3,324,662; and 3,324,663, as well as in *Polyesters and Their Applications* by Bjorksten Research Laboratories, Inc., Reinhold Publishing Corporation, New York, 1956 and *Unsaturated Polyesters* by Herman V. Boeing, Elsevier Publishing Company, Amsterdam, London, New York, 1964, all of which are included by reference herein. A typical resin useful in connection with the present invention consists of a 65-35 by weight mixture of fumaric acid and phthalic anhydride, esterified with propylene glycol and cut to 70 percent polyester by weight with a 50—50 by weight blend of styrene and vinyl toluene. There is added to this basic resin mixture a cure accelerator and fillers such as limestone, dolomite or other mineral filler to the extent of about 73 percent by weight. These parameters can be varied to suit particular conditions. Typically, the curing agent comprises benzoyl peroxide used in suitable curing quantities and is kept separate from the basic mixture until reaction, setting and hardening is desired.

The introduction of the resin and curing agent or hardener into a drill hole in a mine, especially in the roof of the mine, the subsequent insertion of the bolt into the hole and the blending and mixing of the resin and curing agent around the bolt so that the material will react and set, harden and cure, offers some interesting problems. The resin and curing or hardening agent must, of course, be kept separated from each other until the bolt is in place and the resin is to be cured and hardened. Furthermore, when it is desired to bring the resin and curing or hardening agent together, distribution of the curing agent or hardener in the resin is important so that the two might be homogeneously mixed and the reaction and curing and hardening of the resin might be even and uniform.

One type of packaging which has been found to be especially suited for the packaging of the resin and curing or hardening agent and for the insertion of the two into a drilled hole in a mine, such as in the mine roof, with a bolt, is formed by folding and rolling a thermoplastic sheet into a tube having a smaller inner tubing therein. The outer tube and smaller inner tube are formed simultaneously, the larger outer tube is filled with resin and the smaller inner tube filled with curing or hardening agent and the tubes are cut off and sealed in sausage-like length with, for example, wire.

An apparatus heretofore found suited and adaptable for the forming and filling of multi-compartment sausage-like containers for resin and curing or hardening agent adapted for use with mine bolts is shown and described in U.S. Pat. No. 4,009,778, dated Mar. 1, 1977. In the apparatus and method of that patent a film sheet of suitable packaging material is fed, longitudinally, folded along one edge, and is passed through a forming head where the film sheet, with the folded edge, is rolled into a tube having a second, smaller tube therein at the folded edge. The tubes are then advanced along mandrels which shape the inner and outer tubes. The edges of the sheet are slightly overlapped and are heat sealed along the overlapped edge. The tubes are then filled through the mandrels. The filled tubes are divided into sausage-like lengths by wire wraps tightened around the tubes at prescribed lengths to gather and seal the sausage-like lengths. Closely spaced wire wraps are employed to end one length and start the next and the tubes are severed between such closely spaced wraps.

One of the difficulties with the apparatus and method of the U.S. Pat. No. 4,009,778 patent is in the control of the heat sealing unit and the seal formed thereby. Some material, such as polyester films, for example, Mylar, are not particularly suited for heat sealing in such apparatus and method. Others, such as polyethylene, although suited for heat sealing, tend to be temperature sensitive making the formation of a uniform seal along the length of the container difficult. If the seal, itself, or the material adjacent to the seal is weak or weakened by the sealing process, undesirable leakage during storage and before use may occur. Even without such leakage, when pressure is applied to the container in inserting the unit into a drilled hole or in inserting the bolt and before the bolt is turned for setting, the container may rupture and leak at the weak or weakened area, preventing uniform, homogeneous mixture of the resin and hardening or curing agent and uniform setting and hardening of the resin. This, of course, is undesirable.

In the instant invention, the difficulties heretofore encountered in providing a strong, uniform seal along the container are eliminated by sealing the container ultrasonically. The overlapping edge of the sheet, as the bi-tubular container is formed, are passed between an ultrasonically energized horn and a mandrel. The overlapped sheet edges between the mandrel and the ultrasonically energized horn, are instantaneously brought to a high temperature by the localized energy from the energized horn. The temperature of the sheet material between the horn and anvil is thus raised, almost instantly, without softening or damage to the adjacent sheet material. A continuous, uniform seal is formed along the container as the container material is advanced between the horn and anvil.

The method and apparatus of the instant invention will be more fully described and will be better understood from the following description taken with the appended drawings of a preferred embodiment of the invention in which FIG. 1 is a perspective view of the apparatus of the invention;

Figure 1:
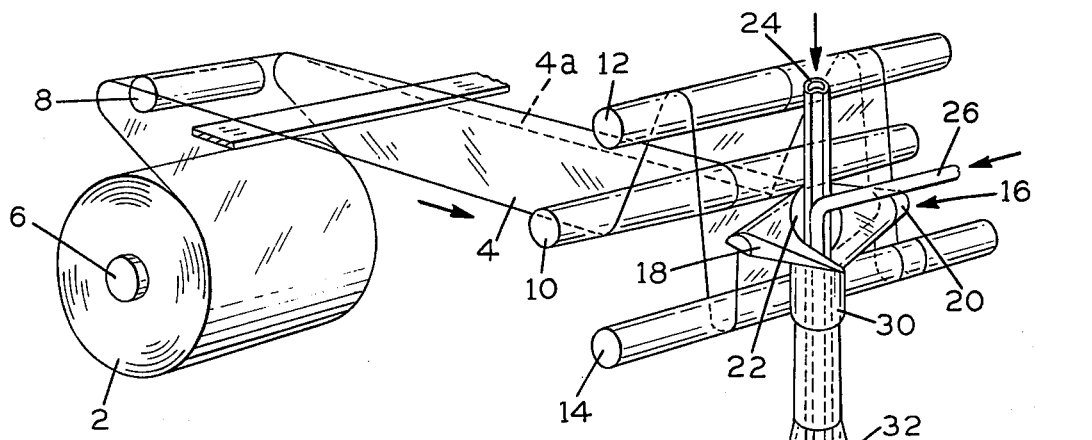

Referring to the drawings, roll 2 of film sheet material 4, such as, polyethylene, vinyl polymers, polymeric linear terephthalate esters, such as polyethylene terephthalate or Mylar, or similar thermoplastic film sheet material compatible with the resin and curing or hardening agent to be filled therein, is mounted on shaft 6 for rotation thereon. Sheet material 4 is unrolled from roll 2 and is fed over paralled mounted rollers 8, 10, 12 and 14. Preferably, rollers 10 and 12 are slightly crowned to maintain sheet material 4, as it is drawn thereacross, in alignment. A forming head, generally designated 16, having outwardly extending, inwardly sloping shoulders 18, 20 and a downwardly extending circular opening 22 is mounted in vertical fixed position in alignment with the feed center of rollers 8, 10, 12, 14. A large resin feed mandrel 24 and smaller curing agent feed mandrel 26 extend through opening 22 and sleeve 28 of forming head 16.

Sleeve sizing collar or bullet, generally designated 30, having an outwardly sloping upper portion 32, a cylindrical shaped body 34, with a longitudinally extending slot 36 and anvil cut-out 38, is mounted in fixed position on mandrel 24, such as by the tension in the unit and a boss or detent in the surface of mandrel 24. Bullet 30 is, preferably of a resilient, nonfriction, wear-resistant material, such as tetrafluoroethylene polymer, for example Teflon made and sold by E. I. du Pont de Nemours and Co., or is coated therewith. Anvil 40 of carbide or other hard, wear-resistant material, is fixed to mandrel 26 in cut-out 38 of bullet 30 with its outer arcuate surface in alignment with the outer surface of body 34 of bullet 30.

Figure 2:
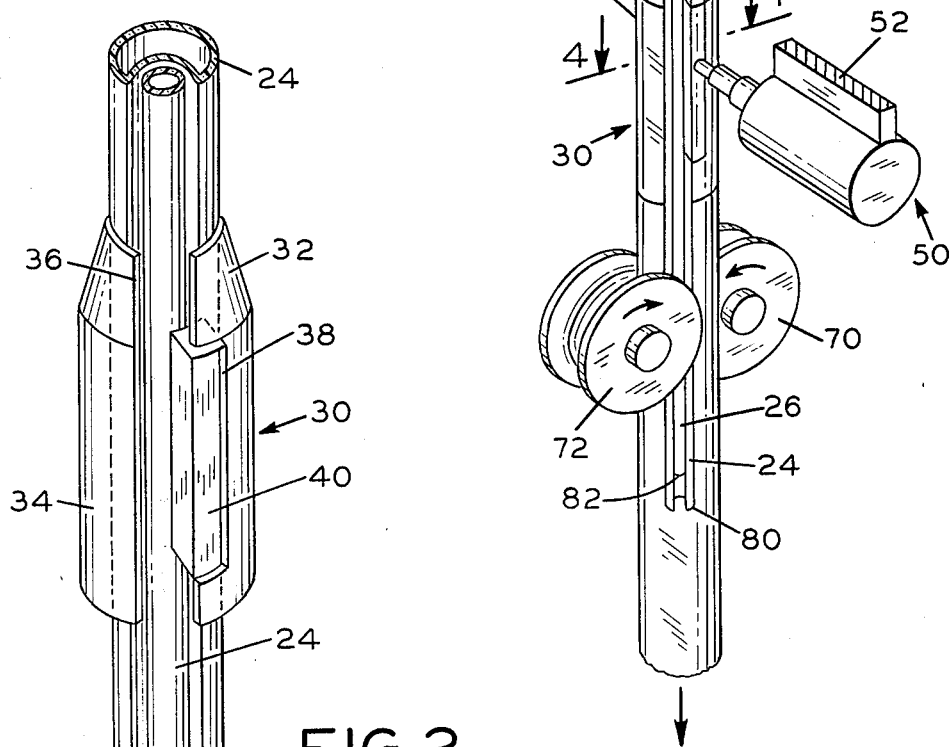
FIG. 2 is an enlarged perspective view of a portion of the apparatus of FIG. 1.
Figure 3:
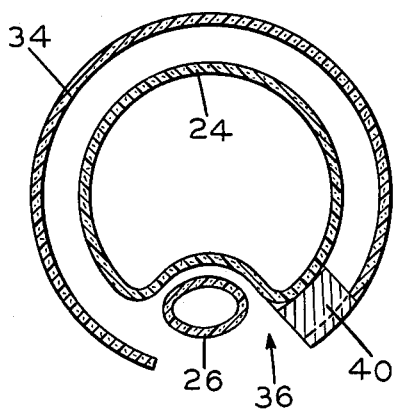
FIG. 3 is an enlarged cross sectioned view of the mandrels, anvil and sizing bullet employed in carrying out the invention.
Figure 4:
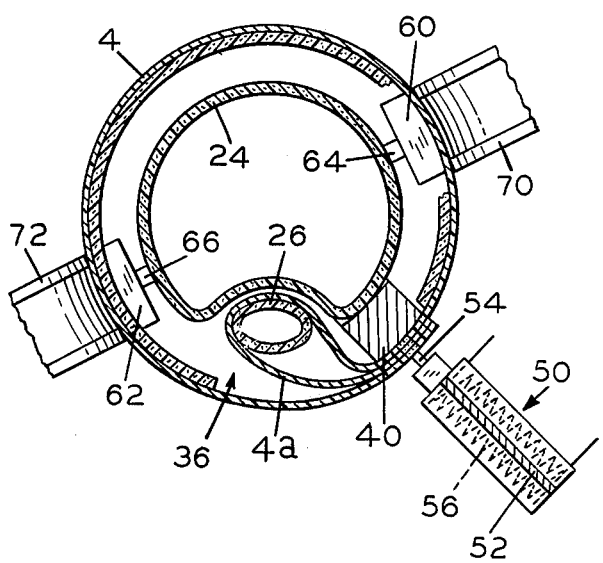
FIG. 4 is an enlarged view, partly broken away, taken at 4—4 Figure.

Ultrasonic unit, generally designated 50, is mounted in fixed position at 52 with ultrasonically energized stylus 54, FIGS. 2, 4, at right angle to and aligned with anvil 40. Stylus 54 is energized by coil 56 of an ultrasonic generator. A standard 20,000 $H_Z$ ultrasonic unit powered by a 600 W R. F. generator and made and sold by Ultrasonic Seal Co., Broomall, Pa. as its Vibra Seal CS-600 Sealing Head has been found to be particularly suited as the ultrasonic unit. For reasons more apparent later herein, ultrasonic unit 50 may include spaced, parallel styluses 54a, 54b, FIG. 5.

Figure 5:
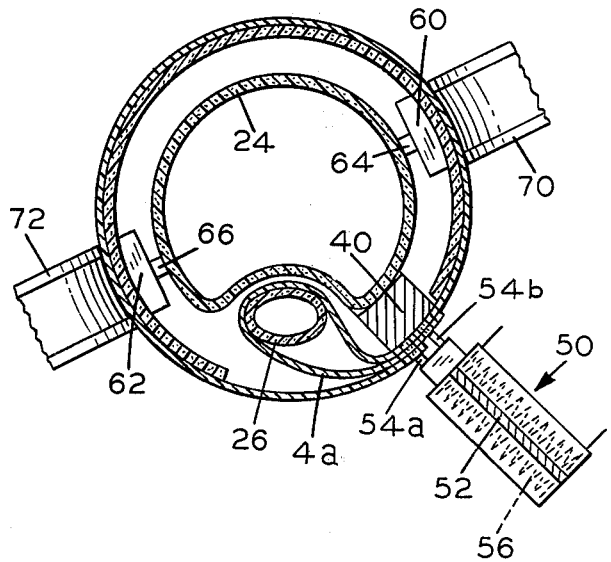
FIG. 5 is an enlarged view, similar to FIG. 4 but showing a modification of the apparatus and container produced thereby.

As best shown in FIGS. 4 and 5, arcuate shoes 60, 62 are mounted at 64, 66, respectively, on mandrel 24. Driving heads 70, 72 are mounted at the opposite sides of mandrel 24, are driven in the directions of the arrows, FIG. 1, and engage sheet material 4 with shoes 60, 62, as will be described, to feed sheet material 4 from roll 2 through the apparatus. Resin feed mandrel 24 is open at its lower end 80 below driving heads 70, 72. Curing agent feed mandrel 26 is open at its lower end 82 just above the lower open end 80 of mandrel 24.

In the operation of the apparatus and practice of the method of the present invention, sheet film material 4, such as polyester film, for example, Mylar film, is fed from roll 2 around roll 8, crown rollers 10, 12 and roller 14 into forming head 16. As sheet 4 is fed from roll 8 to crown rollers 10, 12 and roller 14, edge 4a of the sheet is folded under for purposes later explained.

As sheet 4 enters head 16, shoulders 18, 20 shape the folded portion 4a of sheet 4 into a tube around feed mandrel 26, FIGS. 4 and 5 and the main portion of sheet 4 into a tube around mandrel 24 with the edges of sheet 4 overlapped. The sheet, formed into tubes, is drawn downwardly around bullet 30, is shaped and sized thereby, and the overlapping edges of sheet 4 are drawn over anvil 40 and between anvil 40 and stylus 54.

The feed of sheet film 4 from roll 2 over roll 8, rollers 10, 12, 14 into head 16, the folding of sheet film edge 4a, the forming of the sheet into tubes and the passage of the overlapped edges of sheet 4 between anvil 40 and stylus 54 is all accomplished by driving heads 70, 72 and the engagement of the sheet film material therewith and between the corresponding shoes 60, 62.

As the overlapping edges of sheet film 4 are drawn downwardly between anvil 40 and stylus 54, ultrasonic unit 50 is energized. Stylus 54 which, like anvil 40 is of a carbide material, is vibrated at high frequency, for example, 20,000 $H_Z$, energizes the material between the end of stylus 54 and anvil 40, causes the temperature in the area of the material engaged between the stylus and anvil to rise, sharply, and causes the overlapped ends, at such engagement, to fuse. This is accomplished without substantial rise in temperature of the sheet film material at the opposite sides of the area in engagement with the stylus and anvil where actual fusing takes place. Thus, especially with polyester film sheets where the temperatures where the film fuses and where the film melts are close to being the same, the ability to localize and to control the fusing temperature is of substantial importance. A consistent and uniform seal along the length of the tubes, which is important when the two tubes are to be ruptured and the resin and curing or hardening agent are to be mixed, is attained in the instant invention. At the same time, weakening of the film sheet in the area along and adjacent to the seal, which would cause leaking and premature rupture of the tubes, is avoided.

Figure 6:
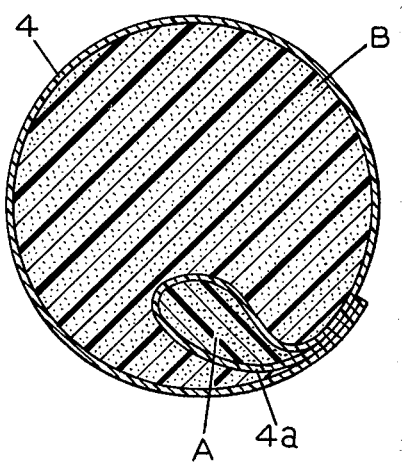
FIG. 6 is an enlarged cross sectional view of the container produced in the method and apparatus of FIGS. 1 and 4.

After the overlapping ends of the tubes have been fused, cured or hardened agent A, FIG. 6, is fed through mandrel 26 into the smaller tube formed by folded edge 4a and resin B, FIG. 6, is fed into the larger tube through mandrel 24.

The edges of sheet 4 may be overlapped and fused in the instant invention by a single fuse line extending longitudinally of the tube, such as with the single stylus 54 of FIG. 4, or with parallel fuse lines, such as with the parallel styluses 54a, 54b of FIG. 5. In either event, the fusing and sealing of the tubes is accomplished without serious deterioration or damage to the adjacent sheet film area.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed:

1. A method for making a tubular container having an inner, smaller tubular container extending longitudinally from film sheet material comprising the steps of:
   (a) feeding said film sheet material longitudinally;
   (b) while feeding said material longitudinally folding one edge of said film sheet onto said sheet and forming a two ply portion with said one edge and said fold;
   (c) forming the film sheet into a tube by overlapping the unfolded other sheet edge with the open edge of said two ply fold with said overlapped edges staggered so that said two ply fold edge projects beyond said unfolded sheet edge when said film sheet is formed into a tube and with said two ply portion within said formed tube;
   (d) advancing said formed tube over a shaping body and passing the overlapped edges of said formed tube between an anvil and a pair of parallel ultrasonically energized styluses and heating and fusing said edges so that one stylus heats and fuses said two ply fold projecting edge and the other stylus heats and fuses said unfolded sheet edge to the film sheet material underlying said unfolded sheet edge, and
   (e) with said edges fused, filling the tube formed by the two ply portion, within the formed tube, with a curing agent and the formed tube with a resin.

2. A method, as recited in claim 1, in which said film sheet material is of polyethylene terephthalate.

3. An apparatus for making a tubular container, having an inner, smaller tubular container extending longitudinally therein, from film sheet material comprising, means for feeding film sheet material longitudinally from a supply roll, means for folding one edge of said film sheet, as said sheet portion is fed longitudinally onto said sheet to form a two ply portion along such one edge, forming means for forming said film sheet with said folded edge portion into a tube with the unfolded other sheet edge overlapping the open edge of said two ply fold and with said folded portion in said tube, an anvil, a bullet shaped sizing means around said anvil, said bullet shaped sizing means having a recess for said anvil, an ultrasonic stylus in engagement with said anvil, means for advancing the overlapping edges of said film sheet formed into said tube between said anvil and said ultrasonic stylus, and means for energizing said ultrasonic stylus as said overlapping edges of said film sheet pass therebetween for heating and fusing said sheet edges.

4. An apparatus, as recited in claim 3, in which said sizing means is a bullet shaped body.

5. An apparatus, as recited in claim 3, in which said anvil and said stylus are of carbide material.

6. An apparatus, as recited in claim 3, including parallel disposed ultrasonic styluses in engagement with said anvil.

7. An apparatus, as recited in claim 6, in which said anvil and said styluses are of carbide material.

* * * * *